(12) United States Patent
Parry et al.

(10) Patent No.: US 8,491,309 B2
(45) Date of Patent: *Jul. 23, 2013

(54) WEARABLE WOUND SIMULANT

(75) Inventors: David Parry, Yardley, PA (US); Daniel Parry, Dublin, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,848

(22) Filed: Jun. 26, 2012

(65) Prior Publication Data
US 2012/0276511 A1    Nov. 1, 2012

Related U.S. Application Data

(63) Continuation-in-part of application No. 12/131,980, filed on Jun. 3, 2008, now Pat. No. 8,221,129.

(51) Int. Cl.
*G09B 23/28* (2006.01)
(52) U.S. Cl.
USPC ........................................................ 434/272
(58) Field of Classification Search
USPC ................................................. 434/272, 274
See application file for complete search history.

(56) References Cited

U.S. PATENT DOCUMENTS
2,945,304 A  *  7/1960  Niiranen et al. ............. 434/268

* cited by examiner

*Primary Examiner* — Robert J Utama
*Assistant Examiner* — Evan Page
(74) *Attorney, Agent, or Firm* — Michael Crilly, Esq.

(57) ABSTRACT

A wearable wound simulant for simulating a battlefield wound is presented. The simulant facilitates a graphically and functionally realistic medical training tool. The simulant includes a skin replica and a wound. The skin replica is shaped to conformably contact and cover a body region either in part or whole. The skin replica further includes a plurality of bendable layers arranged to approximately replicate the visual and tactile properties of human tissue and at least one tear resistant layer composed of a fabric material disposed between two bendable layers. At least one tear resistant layer is less stretchable than the elastic limit of the bendable layers so as to prevent failure thereof. The bendable and tear resistant layers form a self-sealing structure. A three-dimensional wound structure is disposed along the skin replica so as to replicate the appearance and functionality of a penetrating or non-penetrating injury.

17 Claims, 19 Drawing Sheets

WEARABLE WOUND SIMULANT

CROSS REFERENCE TO RELATED APPLICATIONS

This application is a continuation-in-part of U.S. Non-Provisional application Ser. No. 12/131,980 filed Jun. 3, 2008, now allowed for patent, which is incorporated in its entirety herein by reference thereto.

FEDERALLY SPONSORED RESEARCH AND DEVELOPMENT

The invention was made with Government support under Contract No. N61339-07-C-0038 awarded by the U.S. Army Research, Development, and Engineering Command, Simulation and Training Technology Center. The Government may have certain rights in one or more forms of the invention.

BACKGROUND OF THE INVENTION

1. Field of the Invention

The present invention generally relates to a device capable of simulating a battlefield wound for training purposes. Specifically, the invention includes a plurality of bendable layers disposed about a fabric layer to form a self-sealing structure. The fabric layer constrains the bendable layers so as to avoid stretch conditions which exceed the failure threshold of the bendable layers. The device includes a three-dimensional structure which replicates the appearance and functionality of impact, penetration, fire, and/or blast induced injuries.

2. Background

The survivability of a wounded soldier has never been better due in large part to improvements in the field of medical treatment, including treatment by non-medical personnel. The medical-related skills of soldiers are developed by intensely realistic training sessions during which actors wear makeup and/or vinyl devices which replicate the appearance of horrific, life-threatening wounds.

Makeup-based wound simulants include the application of compositions onto the skin of an actor. This approach includes several deficiencies. For example, the application process can be quite lengthy depending on the severity of a wound and the degree of detail desired. Also, the appearance achieved with makeup degrades over time and with use. Furthermore, the visual rather than functional aspect of makeup limits training to a recitation of treatment steps by a trainee. Accordingly, makeup lacks the realism required to properly train non-medical personnel and is not conducive to training sessions involving many different wound types and/or multiple trainees.

Vinyl-based wound simulants are molded elements which partially conform to the exterior of a particular body region and superficially represent a wound. Typically, paint is applied to the surface of these devices to enhance and supplement overall appearance. Presently known devices suffer from a wide variety of deficiencies related to appearance, functional realism, and teaching value.

From an appearance perspective, vinyl-based wound simulants do not accurately replicate the visual properties of tissues and bone. These devices are attached to an actor via straps which are secured by rivets, the latter eventually tearing free from the devices with use. Also, appearance degrades over time as paint flakes from the device and nicks, cuts, and tears compromise the shape and integrity thereof. Furthermore, such devices lack the elasticity to properly conform to the human body. Finally, such devices do not completely surround a body region, but rather contact a small portion thereof.

From a functional perspective, vinyl-based wound simulants do not accurately replicate the tactile properties, namely, softness, hardness, compressibility, pliability, resiliency, flexibility, bendability and/or elasticity, of tissues and bone. Also, the construction of such devices precludes functional realism, including the replication of seeping-type wounds and the probing and/or packing of wounds. Furthermore, vascular elements are simulated by rigid tubes which do not replicate the compressibility of vascular structures.

In terms of teaching value, vinyl-based wound simulants simulate the wound only and therefore do not provide a clinically accurate representation of a vascular system adjacent thereto, which is sometimes required for the holistic treatment of an injury. Also, the two-dimensional nature of such devices does not enable a student to probe and pack a wound. Furthermore, such devices preclude the use of needles and the like because resultant holes compromise the integrity of the device. Finally, such devices lack moving parts to replicate internal organs dislodged from a wound.

As is readily apparent from the discussions above, the related arts do not include a wearable wound simulant which replicates the visual, tactile, and functional aspects of battlefield wounds and the tissues and structures adjacent thereto.

Accordingly, what is required is a wearable wound simulant capable of replicating such properties so as to facilitate a realistic medical training tool.

SUMMARY OF THE INVENTION

An object of the invention is to provide a wearable wound simulant capable of replicating the visual, tactile, and functional aspects of a wound and tissues and structures adjacent thereto so as to facilitate a realistic medical training tool.

In accordance with embodiments of the invention, the wearable wound simulant includes a skin replica and a wound. The skin replica is shaped to conformably contact and cover a body region either in part or whole. The skin replica further includes a plurality of bendable layers arranged to approximately replicate the visual and tactile properties of human tissue and at least one tear resistant layer composed of a fabric material disposed between two bendable layers. The tear resistant layer is less stretchable than the elastic limit of the bendable layers so as to prevent failure thereof. The bendable and tear resistant layers form a self-sealing structure. The wound structure is disposed along the skin replica.

In accordance with yet other embodiments of the wearable wound simulant, the resilience of the tear resistant layer secures the skin replica to the body region.

In accordance with yet other embodiments of the wearable wound simulant, the tear resistant layer is pre-stressed to apply a compressive load onto the bendable layers.

In accordance with yet other embodiments of the wearable wound simulant, the resilience of the bendable layers secures the skin replica to the body region.

In accordance with yet other embodiments of the wearable wound simulant, the wound structure is associated with a penetrating event or a non-penetrating event.

In accordance with yet other embodiments of the wearable wound simulant, the wound structure replicates a bruise, a blunt trauma, a hemorrhage, a laceration, an avulsion, an impalement, an evisceration, a burn, an open wound, a fractured bone, an amputation, or a projectile wound.

In accordance with yet other embodiments of the wearable wound simulant, the body region is a limb, a torso, or a head.

In accordance with yet other embodiments of the wearable wound simulant, the skin replica is sock shaped for a foot.

In accordance with yet other embodiments of the wearable wound simulant, the skin replica 1 is glove shaped for a hand.

In accordance with yet other embodiments of the wearable wound simulant, the skin replica is sleeve shaped for a torso, an arm, or a leg.

In accordance with yet other embodiments of the wearable wound simulant, the skin replica is cap shaped for a head.

In accordance with yet other embodiments of the wearable wound simulant, an object is fixed to the tear resistant layer or said bendable layers so as to protrude from the skin replica and to visually replicate impalement of a body region.

Several advantages are offered by the described invention. The invention is durable, as well as graphically and functionally realistic. The invention facilitates visual, tactile, and functional aspects of a battlefield wound enabling diagnosis of injuries and implementation of treatments. The invention is securable without fasteners to a body region.

REFERENCE NUMERALS

| | |
|---|---|
| 1 | Skin replica |
| 2 | Highlight layer |
| 3 | Highlight layer |
| 4 | Base layer |
| 5 | Fabric layer |
| 6 | Backup layer |
| 7 | Depth layer |
| 8 | Pigment layer |
| 9 | Elastic material |
| 10 | Needle |
| 11 | Cavity |
| 12 | Replica |
| 13 | Cavity |
| 14 | Arm simulant |
| 15 | Fracture |
| 16 | Internal layer |
| 17 | Force |
| 18 | Elastic deflection |
| 19 | Leg simulant |
| 20 | Fastener system |
| 21 | Stitching |
| 22 | Arm simulant |
| 23 | Fastener system |
| 24 | Fabric layer |
| 25 | Supply tube |
| 26 | Wound |
| 27 | Resilient opening |
| 28 | Blood simulant |
| 29 | Supply tube network |
| 30 | Reservoir |
| 31 | Surface |
| 32 | Patch |
| 33 | Cavity |
| 34 | Torso simulant |
| 35 | Wound |
| 36 | Wound cavity |
| 37 | Stomach simulant |
| 38 | Wound |
| 39 | Object |
| 40 | Cavity |
| 41 | Fastener system |
| 42 | Seam |
| 43 | Leg |
| 44 | Thigh |
| 45 | Flap |
| 46 | Interior surface |
| 47 | Simulant |
| 48 | Body region |
| 49 | Wound |
| 50 | Simulant |

BRIEF DESCRIPTION OF THE DRAWINGS

Additional aspects, features, and advantages of the invention will be understood and will become more readily apparent when the invention is considered in the light of the following description made in conjunction with the accompanying drawings.

FIG. 8b is a cross-sectional perspective view illustrating the elastic behavior of the skin replica shown in FIG. 8a.

DETAILED DESCRIPTION OF THE INVENTION

Figure 1:
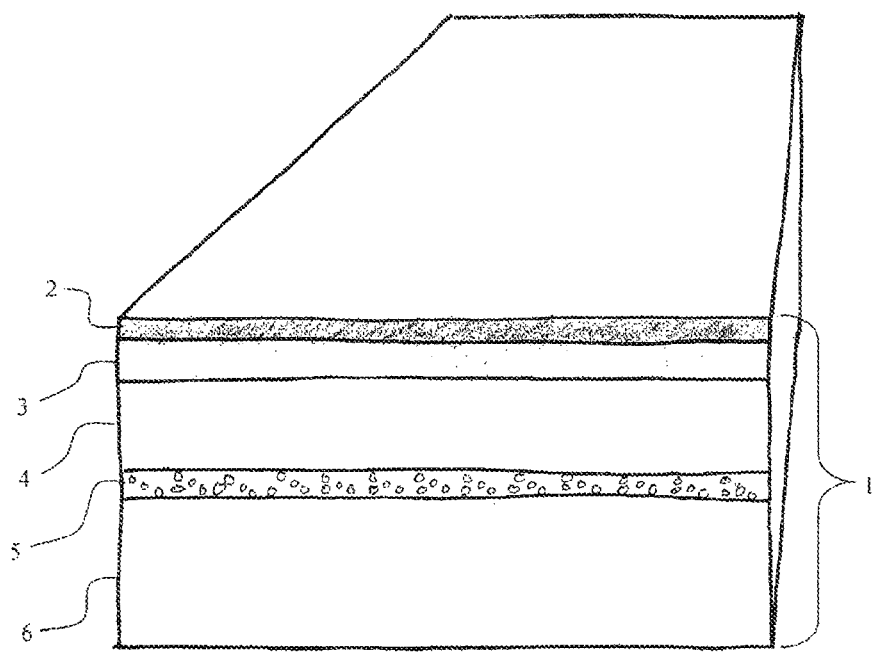
FIG. 1 is a cross-sectional perspective view illustrating construction of a skin replica in accordance with an embodiment of the present invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

The present invention is understood to include a multi-layered structure, referred to as a skin replica 1, and at least one wound 26, 35, or 38 disposed thereon, as described in detail herein. The invention is described with specific reference to applications involving a hand, an arm, a leg, and a stomach; however, it is understood that the present invention is likewise applicable to other regions of a human body, in part or whole. Wounds 26, 35, or 38 are also understood to mean a structure representative of an injury caused by a penetrating event or a non-penetrating event, non-limiting examples including impact, blast, fire, and other combat-related events. Exemplary wound types could include, but are not limited to, bruising, blunt trauma, hemorrhages, lacerations, avulsions, gunshot wounds, impalements, eviscerations, burns, open wounds, broken bones, amputations, and projectile wounds.

Referring now to FIG. 1, one embodiment of the skin replica 1 is a multi-layered structure including a pair of highlight layers 2, 3, a base layer 4, a fabric layer 5, and a backup layer 6 arranged and contacting in the order described. Highlight layers 2, 3, base layer 4, and backup layer 6 are each composed of one or more silicone-based polymers, either translucent or transparent, which are flexible, stretchable, compressible and resilient. Low durometer or soft silicones are preferred. The fabric layer 5 is a woven structure or the like, which is flexible, stretchable, and resilient, composed of natural or synthetic fibers, one example being polyester. The fabric layer 5 could be porous before and/or after stretch.

Figure 2:
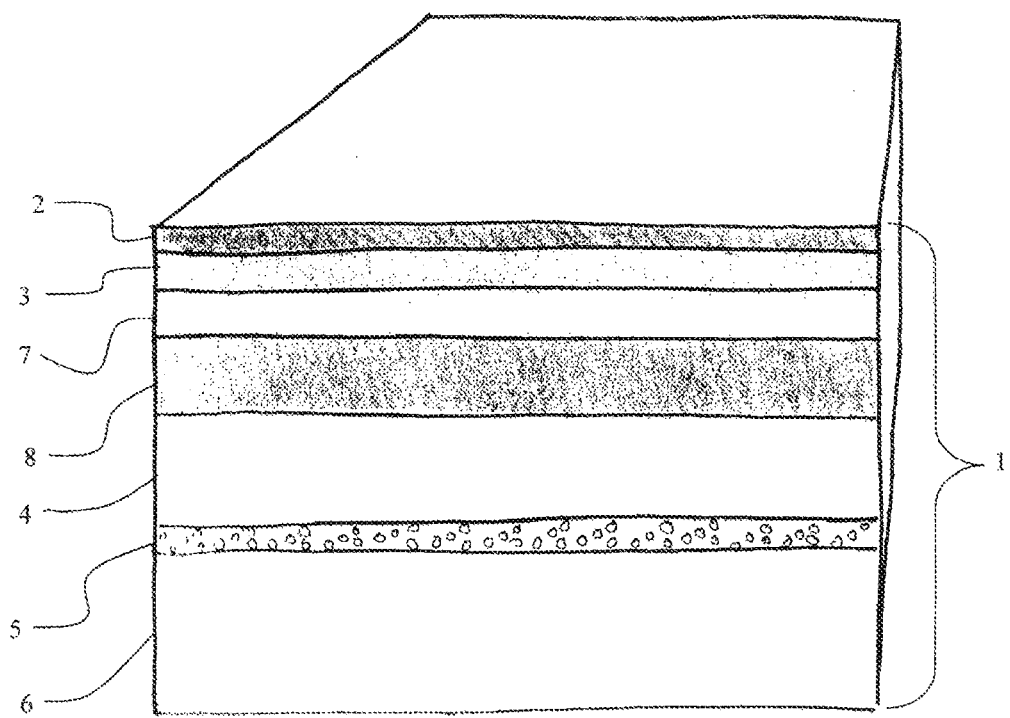
FIG. 2 is a cross-sectional perspective view illustrating construction of a skin replica with bruising effect in accordance with an embodiment of the present invention.

Referring now to FIG. 2, another embodiment of the skin replica 1 is a multi-layered structure including a pair of highlight layers 2, 3, a depth layer 7, a pigment layer 8, a base layer 4, a fabric layer 5, and a backup layer 6 arranged and contacting in the order described. The highlight layers 2, 3 depth layer 7, pigment layer 8, base layer 4, and backup layer 6 are each composed of one or more silicone-based polymers, either translucent or transparent, which are flexible, stretchable, compressible, and resilient.

The color and overall appearance of human skin is the product of dermal layers with different translucent qualities, as well as, the visualization of veins, bruises, bleeding, and other structures below or within the dermal layers. The skin replica 1 replicates or approximates the visual characteristics of human skin via the layered arrangement of polymer layers, each including one or more pigment compositions. The visual characteristics of the highlight layers 2, 3, base layer 4, backup layer 5, depth layer 7, and/or pigment layer 8 interact to produce the color, translucence, and texture of human skin.

The highlight layers 2, 3 are the outermost or exterior layers of the skin replica 1. One purpose of the highlight layers 2, 3 is to replicate the flesh tones of skin. Each highlight layer 2, 3 includes at least one pigment compound which replicates the appearance of flesh. For example, each highlight layer 2, 3 could be composed of a translucent silicone polymer with a thickness less than 1 millimeter loaded with a powdered pigment in a mass concentration of less than 1% by weight; however, other thicknesses and concentrations are possible. Pigments are understood to mean commercial powders readily available at an art supply shop or the like.

One purpose of the base layer 4 is to support the highlight layers 2, 3 and fabric layer 5. The base layer 4 could be composed of a translucent silicone polymer with a thickness of approximately 2 millimeters having a pigment which approximates flesh tones in a mass concentration of less than 1% by weight; however, other thicknesses and concentrations are possible.

One purpose of the backup layer 6 is to further secure the fabric layer 5 to the base layer 4. The backup layer 6 could be composed of a commercially available translucent silicone polymer with a thickness of at least 1 millimeter and optionally loaded with a colored pigment, which approximates flesh tones, to a mass concentration of less than 1% by weight, however, other thicknesses and concentrations are possible.

One purpose of the depth layer 7 is to enhance the depth characteristics of the pigment layer 8 so as to give the appearance of an internal injury. The depth layer 7 could be composed of a translucent silicone polymer with a thickness of approximately 1.5 millimeters, although the thickness is application dependent, loaded with optional flesh tone colored pigments to a mass concentration of less than 1% by weight; however, other thicknesses and concentrations are possible.

One purpose of the pigment layer 8 is to replicate the appearance of an internal injury, examples including but not limited to bruising or bleeding. The pigment layer 8 could be composed of a translucent silicone polymer with a thickness from 1 to 2 millimeters and loaded with optional flesh colored pigments in a mass concentration of at least 3% by weight; however, other thicknesses and concentrations are possible. The intensity of the pigment layer 8 is inversely related to the thickness of the depth layer 7, which is adjusted to achieve the desired appearance.

The fabric layer 5 prevents overstretching of the skin replica 1 beyond the threshold at which the skin replica 1 fails and ensures closure of punctures and/or holes along the skin replica 1. The fabric layer 5 is preferred to be a woven structure or to have a plurality of holes therein to ensure impregnation by silicone polymers comprising the base layer 4 and backup layer 6. The fabric layer 5 could be a translucent, transparent, or colored material which enhances the skin-like appearance of a skin replica 1.

Figure 3A:
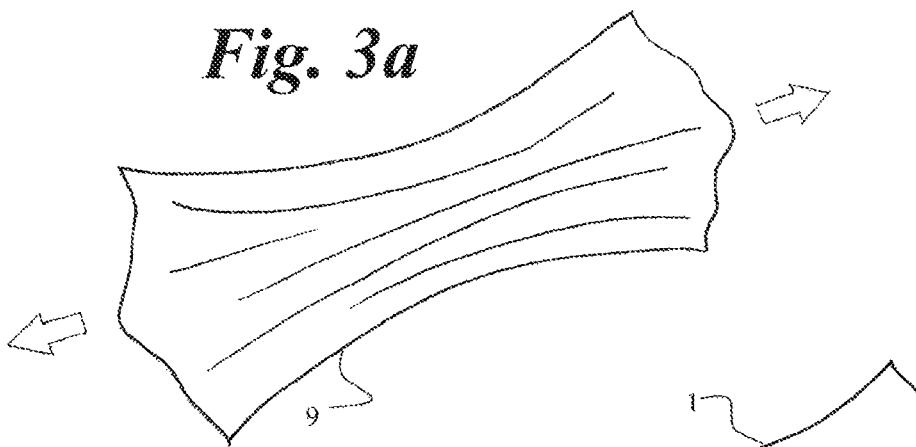
FIG. 3a is a top view illustrating a skin replica prior to overstretch of the bendable layers.
Figure 3B:
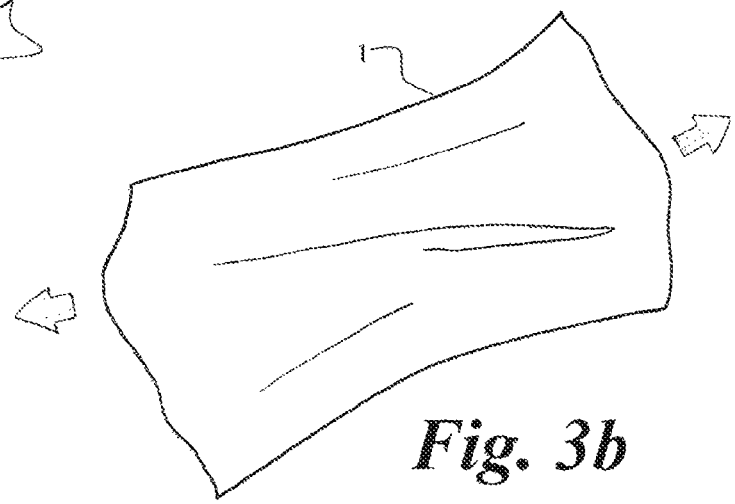
FIG. 3b is a top plan view illustrating a skin replica approaching an overstretch condition of the bendable layers.

Referring now to FIG. 3a, a multi-layered elastic structure 9 is graphically represented in a low-stretch condition. Elastic structures 9 composed of silicone polymers and the like stretch until either a tear or delamination results. Failure occurs when the stretch exceeds the elastic limit of one or more layers in the structure. In the present invention, the fabric layer 5 constrains or limits the degree of stretch otherwise allowable along the structure, as graphically represented in FIG. 3b for an exemplary skin replica 1. Accordingly, the maximum stretch length of the fabric layer 5 should be less than the stretch length at which a failure would occur within one or more polymers comprising a skin replica 1.

Insertion of a needle and intravenous line are critical to the treatment of battlefield wounds. Accordingly, it is desired for a skin replica 1 to allow a trainee to puncture the simulant without irreparably damaging the device.

Figure 4:
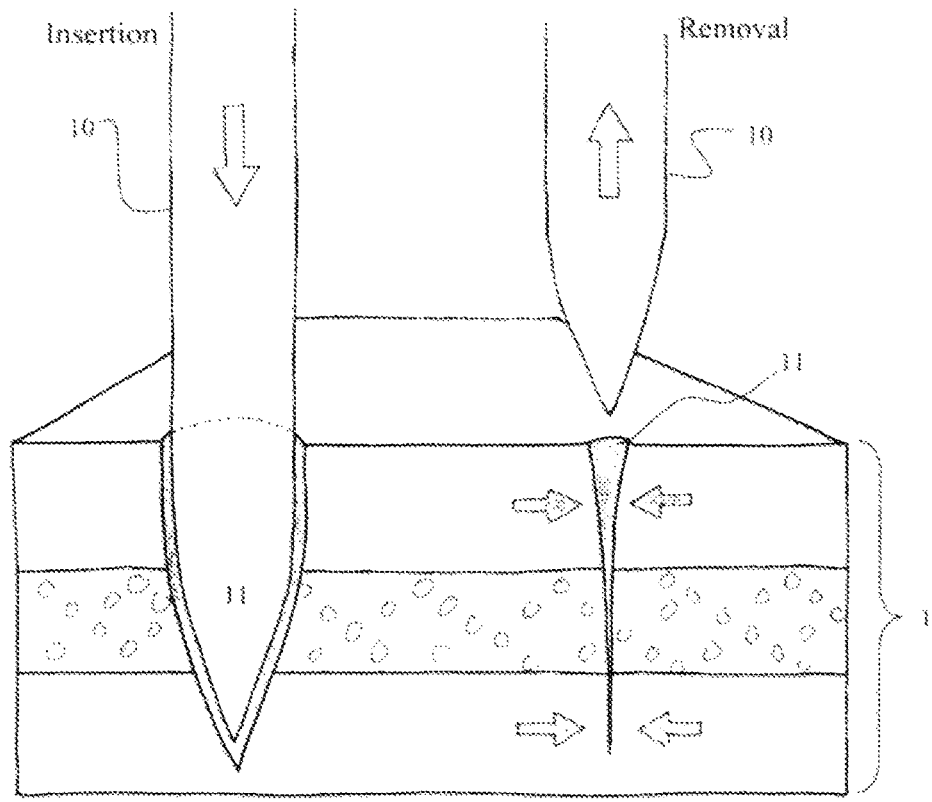
FIG. 4 is a cross-sectional perspective view illustrating the self-sealing behavior of a skin replica in accordance with an embodiment of the present invention.

Referring now to FIG. 4, an exemplary self-sealing skin replica 1 is shown before and after perforation by a needle 10. The layered construction of polymers and fabric, as otherwise described herein, enables the skin replica 1 to deform when penetrated by a needle 10 so as to form a cavity 11, much like the response of human tissues. Upon removal of the needle 10, the elastic properties of the polymers and fabric cause the cavity 11 to collapse or close, much like human tissues, to nearly at least the original condition of the skin replica 1. While subsequent stretching of the skin replica 1 could allow the cavity 11 to reopen in a limited fashion, the cavity 11 will not initiate a tear because of the constraining properties of the fabric layer 5. Furthermore, the fabric layer 5 prevents punctures and tears from propagating along the skin replica 1.

The following is exemplary of one method used to fabricate a skin replica 1. Fabrication of a skin replica 1 includes the layered application of one or more silicone polymers and fabric sheets. One or more polymers with the same, similar, or different flexibility, stretchability, compressibility, and/or resiliency characteristics could be used to replicate the compressibility and elasticity of skin within a particular region of a body. The bond between two polymer layers is preferred to be a chemical or adhesive bond at least as strong as the weakest polymer.

First, liquid-based silicone polymers are blended and mixed with powdered pigments to achieve the desired balance between translucency and color. Next, a pigmented silicone polymer is applied via a brush onto a mold, textured to replicate a body part, and cured at room temperature to form the first highlight layer 2. The mold could include one or more structures which form a hole or cavity into one or more layers of the skin replica 1 to replicate tissues compromised by a projectile, shrapnel, blast, burn, or the like. Next, a pigmented silicone polymer is applied onto the first highlight layer 2 and cured at room temperature to form a second highlight layer 3. Next, a pigmented silicone polymer is applied onto the second highlight layer 3 forming a base layer 4 and thereafter a fabric layer 5 is applied to the base layer 4 before the base layer 4 cures. Thereafter, the base layer 4 is cured at room temperature. Next, a pigmented silicone polymer is applied onto the fabric layer 5 so as to fully impregnate the fabric with polymer. Thereafter, the polymer is cured at room temperature. In some embodiments, the fabric layer 5 could be pre-stretched to a level less than its maximum stretch prior to application of the polymer composition. The resultant pre-stressed structure would ensure compressive loading within the cured polymer.

In some embodiments, a depth layer 7 and pigment layer 8 may be required. The depth layer 7 is applied as a layer of pigmented silicone polymer to the second highlight layer 3 and thereafter cured at room temperature. Next, a pigmented silicone polymer is applied to the depth layer 7 to form a pigment layer 8 and cured at room temperature. Thereafter, base layer 4, fabric layer 5, and backup layer 6 are applied as described herein.

After the last applied layer is cured, the skin replica 1 is removed from the mold and edges are trimmed with a knife or shears to remove excess materials. Finally, an optional seam is cut into the skin replica 1. In some embodiments, the layup of layers could be performed along a planar-shaped mold, thus avoiding the cutting step otherwise required to form a seam.

In yet other embodiments, the mold could be shaped to approximate a body region, in part or whole, such as a torso, head, or limb. In several non-limiting examples, the mold could approximate a hand with or without fingers, an arm with or without a hand, a foot with or without toes, a leg with or without a foot, a torso, a neck, or a head with or without neck. The mold facilitates fabrication of a skin replica 1 without fasteners that slides onto the applicable body region and remains conformably attached thereto. In one example, the skin replica 1 could be a sock-like element slipped onto a foot. In another example, the skin replica 1 could be a glove-like element slipped onto a hand. In yet another example, the skin replica 1 could be a sleeve-like element slipped onto a torso, arm, or leg. In still another example, the skin replica could be a cap-like element slipped onto a head.

Figure 5A:
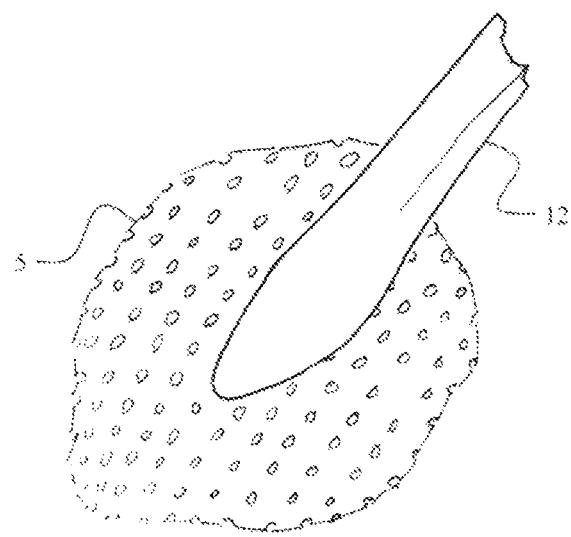
FIG. 5a is a perspective view illustrating attachment of a bone replica to a tear resistance fabric in accordance with a preferred embodiment of the present invention.
Figure 5B:
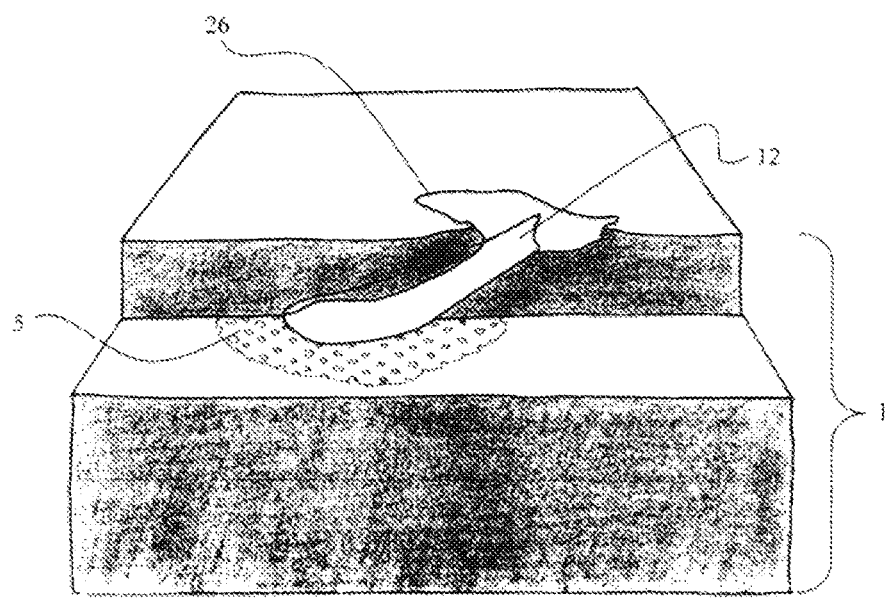
FIG. 5b is a perspective view with partial cross section illustrating attachment of the bone replica and tear resistant fabric layer shown in FIG. 5a to a skin replica in accordance with an embodiment of the present invention.

In some embodiments, a replica 12 could be required to simulate a wound 26. Referring now to FIG. 5a, a replica 12, exemplary of a bone which has fractured or otherwise penetrated the tissues adjacent to a wound 26, is shown attached to a fabric layer 5. The replica 12 could be composed of a hard cast resin, one example being urethane, shaped to replicate the appearance, pigmented to replicate the color as described herein, and composed of a composition to replicate the hardness of a bone. In some embodiments, the replica 12 is disposed along and/or about a portion of a fabric layer 5 and cured so as to bond or mechanically attach the two elements. Resin comprising the replica 12 could fill pores along the fabric layer 12. Thereafter, the fabric layer 5 with attached replica 12 is applied between a base layer 4 and backup layer 6 so as to mechanically lock the replica 12 to the skin replica 1. Further, the replica 12 could protrude from a skin replica 1, as represented in FIG. 5b, within a cavity, hole, or opening along the skin replica 1 representative of a penetration, blast, or impact wound 26.

Figure 6A:
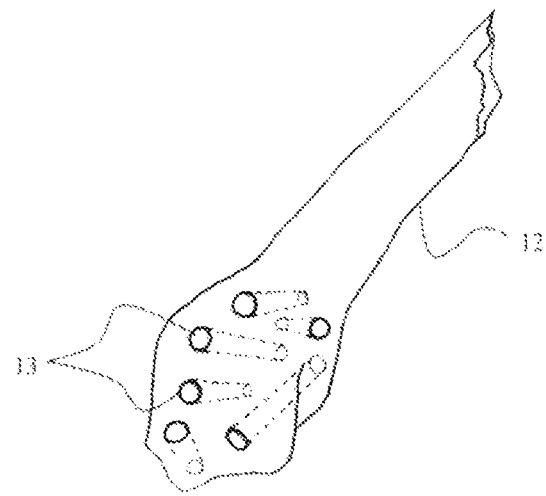
FIG. 6a is a perspective view illustrating a plurality of cavities within a bone replica.
Figure 6B:
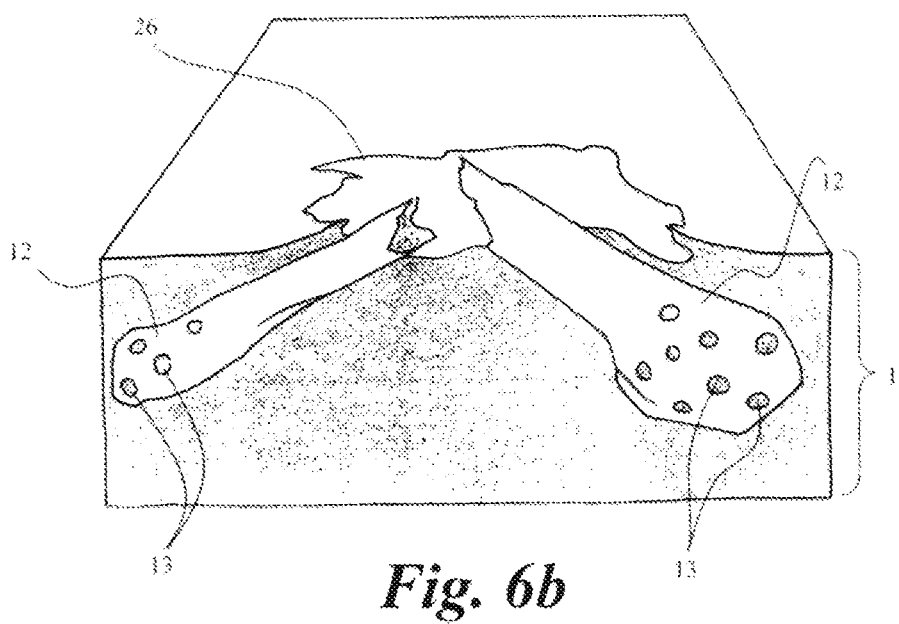
FIG. 6b is a perspective view with partial cross section illustrating attachment of the bone replica shown in FIG. 6a to a skin replica in accordance with an embodiment of the present invention.

Referring now to FIG. 6a, other embodiments of the invention could include a replica 12 having pores or cavities 13 along the bone structure. Cavities 13 could be molded into the replica 12 during fabrication or mechanically drilled into the item after the resin structure has properly cured. Cavities 13 enable attachment of the replica 12 to the skin replica 1, as represented in FIG. 6b. In these embodiments, the replica 12 is positioned within one or more silicone polymer layers prior to cure so as to allow the polymer to fill each cavity 13. Thereafter, the polymer is cured so as to mechanically lock the replica 12 onto the skin replica 1.

With further reference to FIGS. 5a, 5b, 6a, and 6b, the replica 12 could be shaped to present the visual appearance of an object, other than a bone or body part, extending from a body part. In one example, the replica 12 could approximate the ogive and warhead sections of a rocket propelled grenade (RPG) along a first portion of a skin replica 1 and the tail section of an RPG along a second portion of a skin replica 1. In this example, the skin replica 1, when worn on a torso, could replicate the appearance of an RPG embedded within a torso so that the ogive/warhead extend from the users back and the fin assembly extends from the users stomach or chest. The objects and wounds replicable are limitless. The replica 12 could be secured to the polymer layers and/or fabric layer 5 as described herein.

Figure 7:
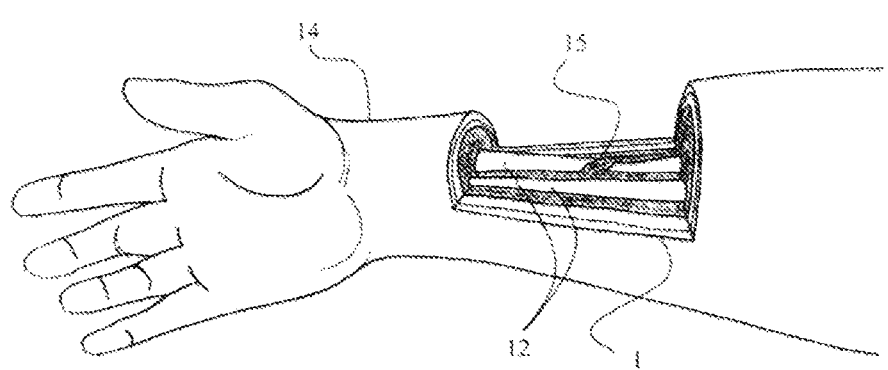
FIG. 7 is a partial section view illustrating a bone fracture within an arm simulant in accordance with an embodiment of the present invention.

Referring now to FIG. 7, an exemplary arm simulant 14 is shown including two or more replicas 12 enclosed within, rather than protruding from, a skin replica 1. One or more replicas 12 could include a fracture 15 or otherwise broken bone exemplary of an internal injury. The skin replica 1 is composed of silicone polymers which mimic the tissues about a fracture 15 so as to allow a trainee to develop the skills required to identify and diagnose a concealed bone injury.

Figure 8A:
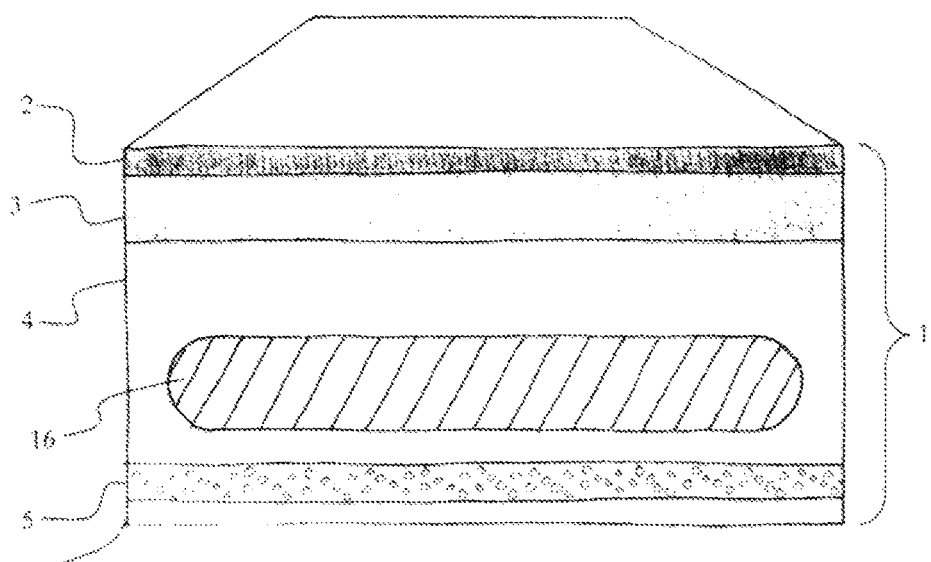
FIG. 8a is a cross-sectional perspective view illustrating construction of a skin replica with optional internal layer in accordance with an embodiment of the present invention.
Figure 8B:
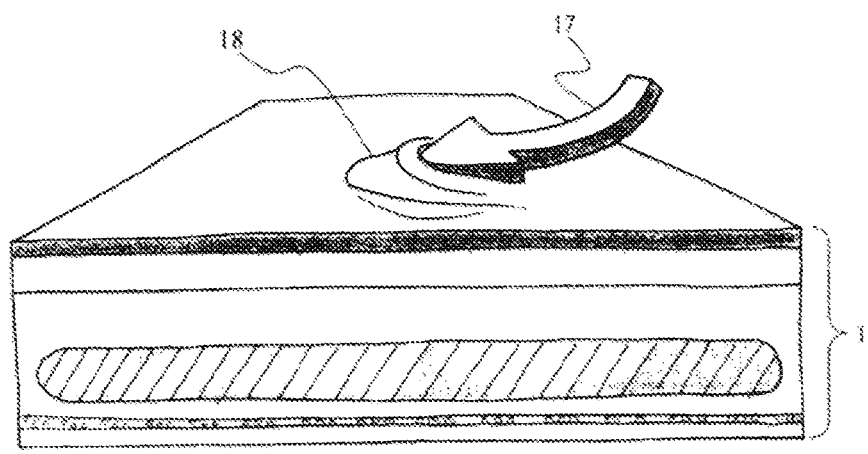

Referring now to FIG. 8a, it might be advantageous in some embodiments to include an internal layer 16 within a skin replica 1 to approximate the properties of fat, muscle, bones, or internal organs. The internal layer 16 could be composed of a silicone polymer which is softer or harder and/or less or more dense or compressible than the highlight layers 2, 3, base layer 4, backup layer 6, depth layer 7, and/or pigment layer 8, which otherwise comprise a skin replica 1. For example, the internal layer 16 could be positioned within the skin replica 1 so that the uppermost layers, namely, highlight layers 2, 3, slough or exhibit an elastic deflection 18 much like skin does over muscle when a force 17 is applied thereto. In preferred embodiments, the internal layer 16 should be enclosed within a base layer 4 and substantially parallel to the highlight layers 2, 3, as represented in FIG. 8b, although other arrangements are possible.

Figure 9A:
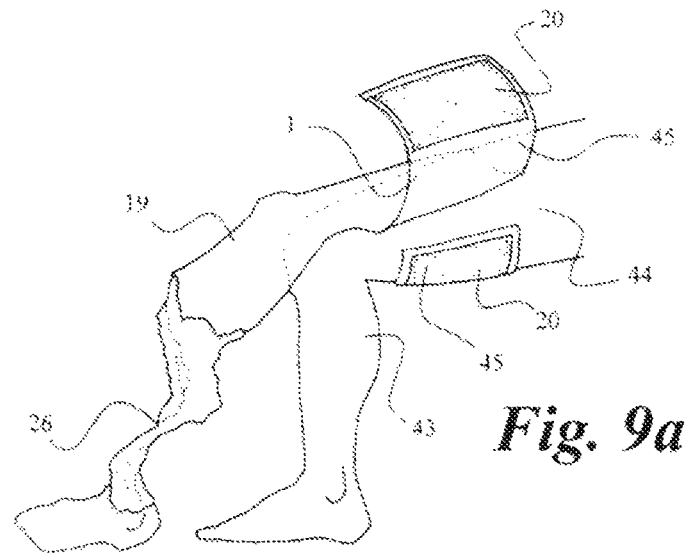
FIG. 9a is a side elevation view illustrating attachment of a leg simulant in accordance with a preferred embodiment of the present invention.
Figure 9B:
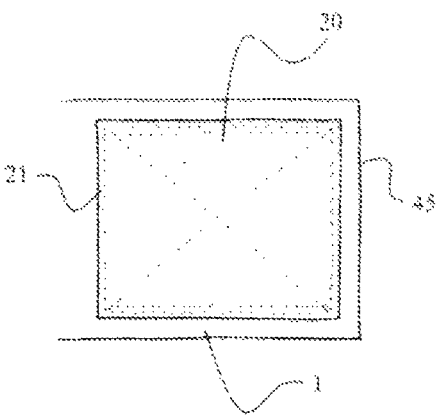
FIG. 9b is a top plan view illustrating attachment of hook-and-loop fasteners to a skin replica.
Figure 9C:
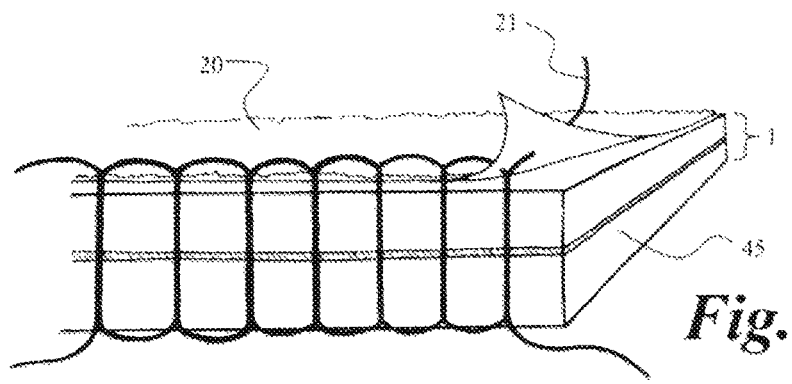
FIG. 9c is perspective view illustrating attachment of hook-and-loop fasteners to a skin replica.

Referring now to FIG. 9a, a leg simulant 19 is shown including a wound 26 at one end and a pair of flaps 45 disposed at another end. Flaps 45 could be composed of one or more layers of a skin replica 1 along the leg simulant 19. The flaps 45 extend from the leg simulant 19 so as to encircle the body part onto which the simulant is applied. A fastener system 20 is attached to the flaps 45, as represented in FIGS. 9b and 9c. In preferred embodiments, the fastener system 20 could include a two piece hook-and-loop device, one example being Velcro®, so that the loop component of the system is attached to one flap 45 and the hook component is attached to the other flap 45. The fastener system 20 could be attached to the flaps 45 via stitching 21, as represented in FIGS. 9b and 9c. In preferred embodiment, the stitching 21 is placed about the perimeter of each fastener element and along two diagonals in an intersecting pattern. The leg simulant 19 could be attached to an actor's leg 43 by encircling the actor's thigh 44 with the flaps 45 and securing the two-piece fastener system 20 thereto, as represented in FIG. 9a. The described attachment structure is likewise applicable to other simulants and replicas described herein.

Figure 10A:
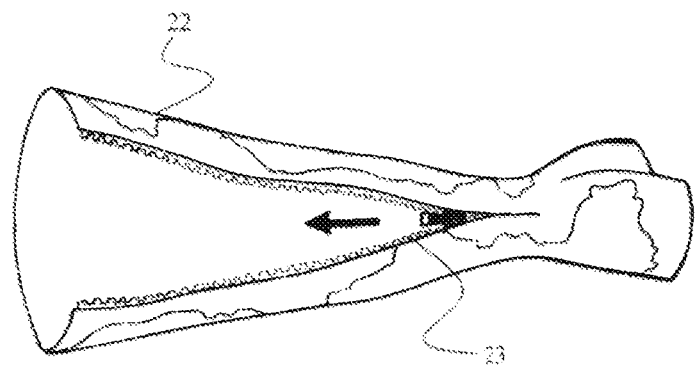
FIG. 10a is a side elevation view illustrating construction of an arm simulant with zipper mechanism in accordance with an embodiment of the present invention.
Figure 10B:
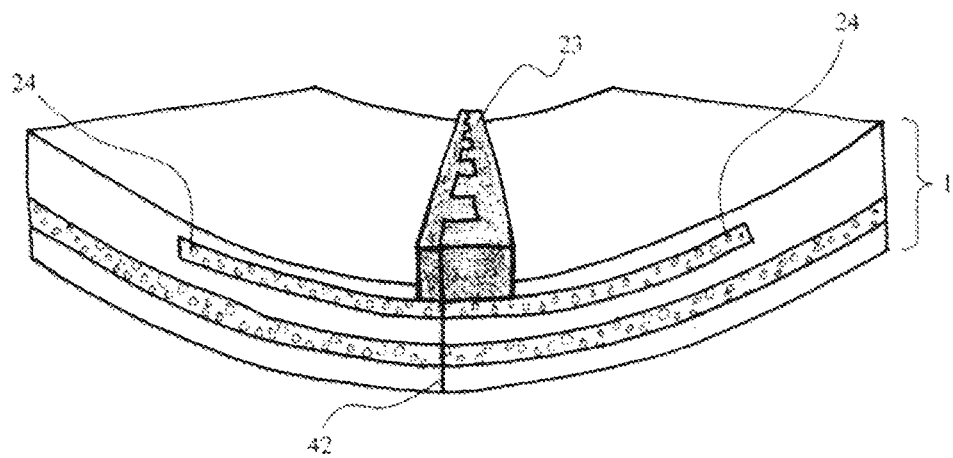
FIG. 10b is a cross-sectional perspective view illustrating attachment of a zipper to a skin replica.

Referring now to FIGS. 10a and 10b, a closable fastener system 23, one example being a zipper, could be provided along a seam 42 of an arm simulant 22 to secure it onto an actor. The two-piece fastener system 23 could be attached to the arm simulant 22 by embedding a pair of fabric layers 24 within a skin replica 1, along the arm simulant 22, about a seam 42. For example, the individual pieces of the fastener system 23 could be adhesively bonded or mechanically attached via stitching to separate fabric layers 24. Thereafter, the fabric layers 24 could be embedded between two polymer layers as described herein. A cover or the like could be placed along the length of the fastener system 23 to conceal it from view. The described attachment structure is likewise applicable to other simulants and replicas described herein.

Figure 11A:
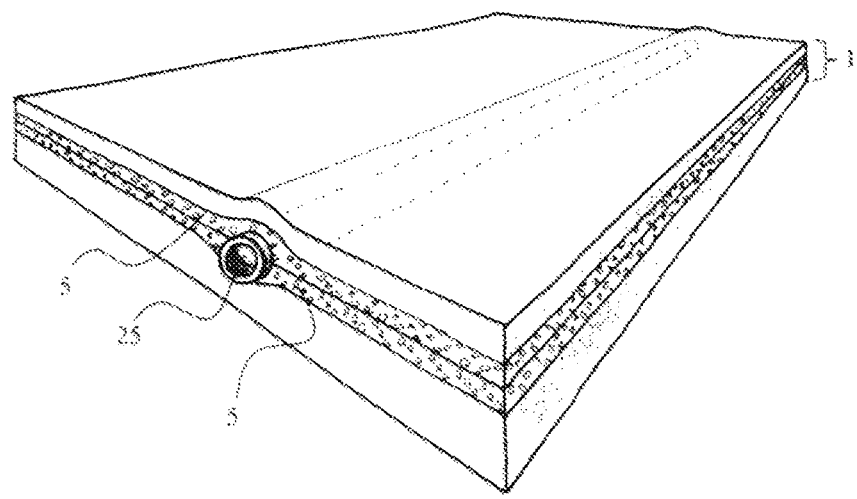
FIG. 11a is a cross-sectional perspective view illustrating attachment of a deformable tube within a skin replica in accordance with an embodiment of the present invention.
Figure 11B:
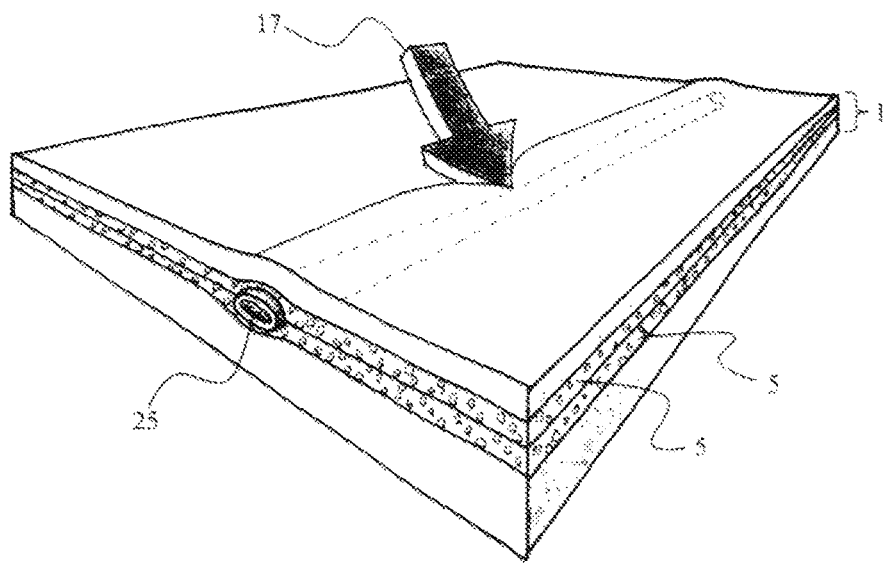
FIG. 11b is a cross-sectional perspective view illustrating deflection of a deformable tube within a skin replica in response to an applied force.

Referring now to FIGS. 11a and 11b, a supply tube 25, replicating the functionality of a vein, artery, or other vascular structure, could be embedded within a skin replica 1. The incorporation of tubes within a multi-layered polymer structure is problematic in that tubes do not bond well with polymers. In the present invention, two fabric layers 5 are disposed about a supply tube 25. The fabric layers 5 are impregnated with a silicone polymer composition so as to bond with the fabric layers 5, rather than directly with the supply tube 25. In preferred embodiments, the supply tube 25 is a compressible, translucent tube disposed between a base layer 4 and a backup layer 6 so as to allow deflection thereof when a force 17 is applied by a tourniquet or the like, as represented in FIG. 11b. The supply tube 25 could also include coloring consistent with human tissues.

Figures 12A, 12B:
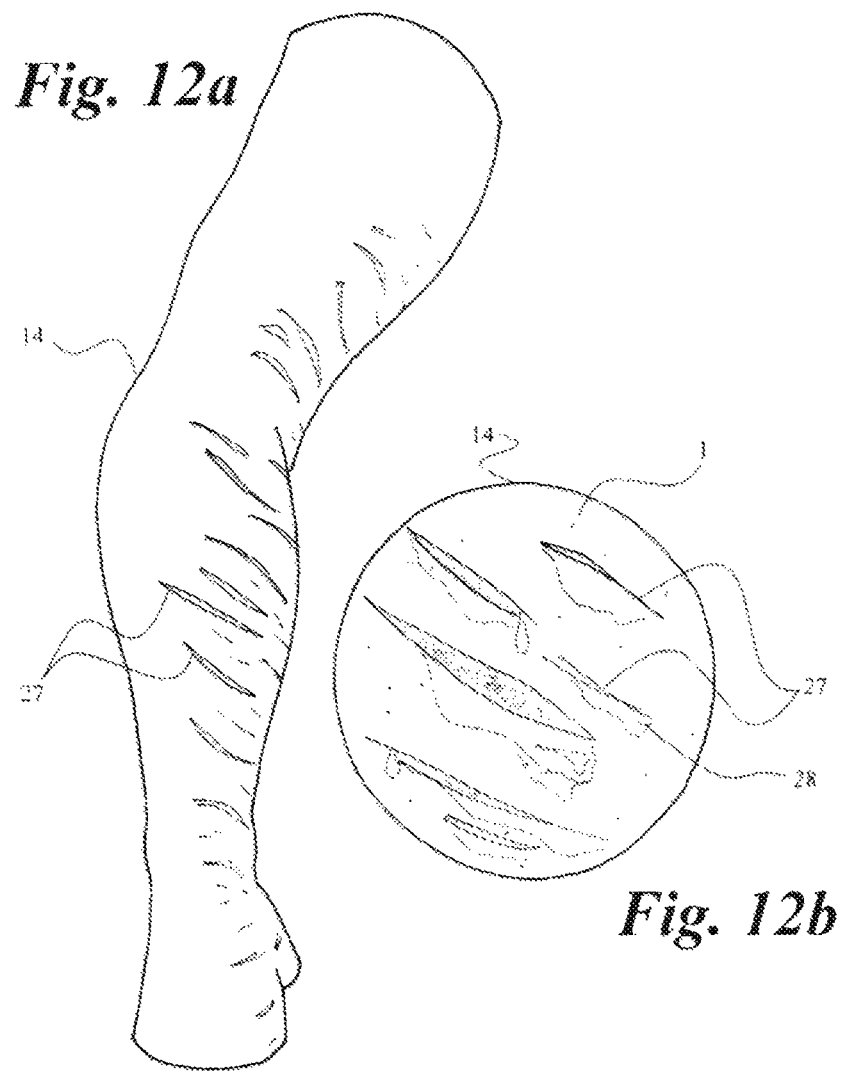
FIG. 12a is a side elevation view illustrating an arm simulant with a plurality of seeping-type wounds in accordance with an embodiment of the present invention.
FIG. 12b is an enlarged view of the arm simulant shown in FIG. 12a illustrating blood loss from seeping-type wounds.

Referring now to FIGS. 12a and 12b, an arm simulant 14 is shown including a plurality of resilient openings 27 replicating a wound from which a blood simulant 28 seeps, rather than spurts or gushes. Each resilient opening 27 is comprised of a slit or pinhole which traverses some or all layers within a skin replica 1. The self-sealing property of the skin replica 1 could prevent the blood simulant 28 from passing through the resilient openings 27 under certain conditions.

Figure 13:
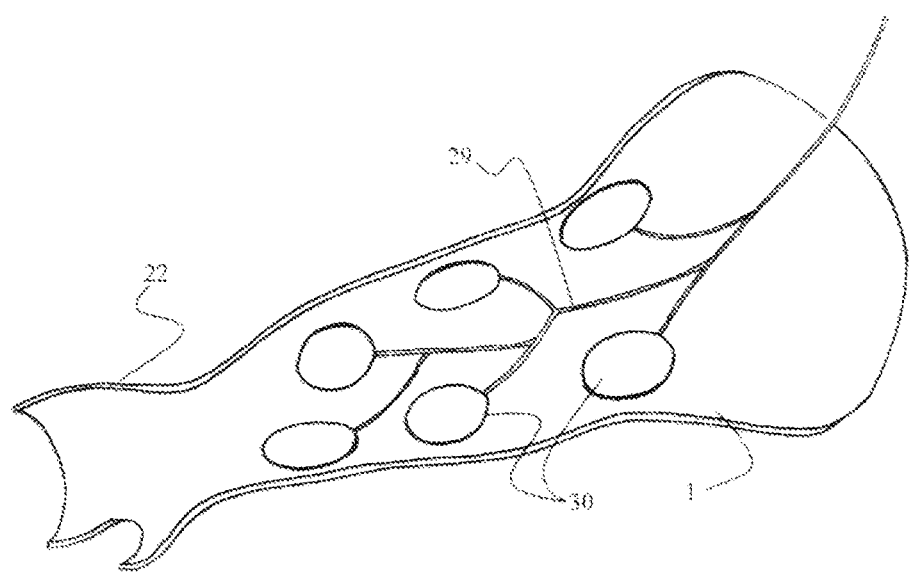
FIG. 13 is a cross-sectional perspective view of the interior of an arm simulant illustrating a network of supply tubes and reservoirs in accordance with an embodiment of the present invention.

Referring now to FIG. 13, a plurality of reservoirs 30 are shown attached to and communicating with a supply tube network 29 along an exemplary arm simulant 22. One end of the supply tube network 29 is attached to a manual or electric pump or the like so as to communicate blood simulant 28 from a container residing within or separate from the arm simulant 22.

A reservoir 30 is understood to be a cavity or container capable of temporarily storing a blood simulant 28 or other body fluid. Each reservoir 30 is disposed along the structure of the skin replica 1 so as to communicate with one or more resilient openings 27. Reservoirs 30 are formed by placing a silicone patch 32 or the like, preferably with flesh tone pigments, onto the base layer 4 or backup layer 6 of a skin replica 1 and at least one tube within a supply tube network 29. Thereafter, the periphery of each patch 32 is bonded to the base layer 4 or backup layer 6 and supply tube network 29 via a silicone resin, including optional flesh tone pigments.

Figure 14:
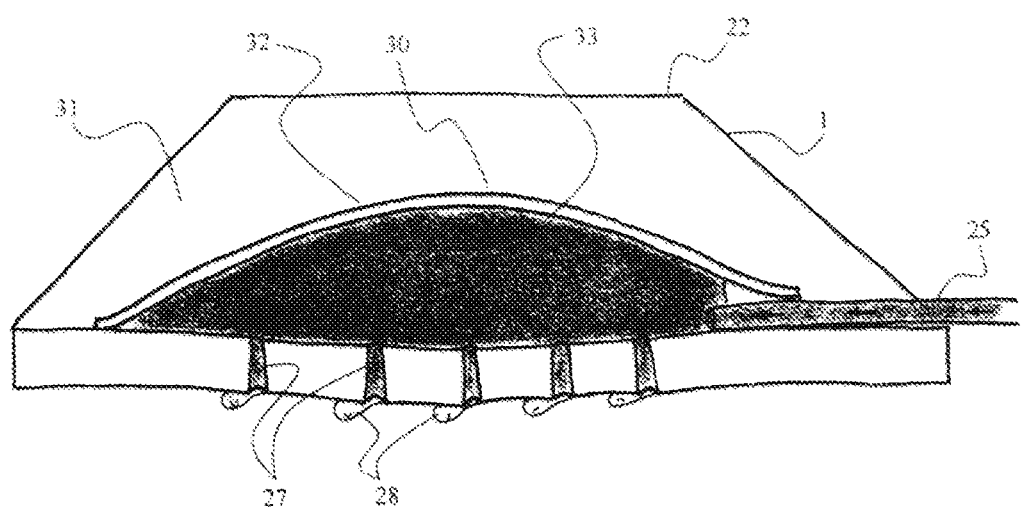
FIG. 14 is a cross-sectional perspective view illustrating construction of a skin replica with bleed structure in accordance with an embodiment of the present invention.

Referring now to FIG. 14, the cavity 33 within a reservoir 30 is shown filled with a blood simulant 28 so that the resilient openings 27 are expanded. The blood simulant 28 passes through or flows from one or more resilient openings 27 when either the pressure exerted by the blood simulant 28 exceeds a threshold value or an actor or trainee applies a force onto the surface 31 adjacent to a resilient opening 27 to negate the self-sealing properties of the skin replica 1.

Figure 15A:
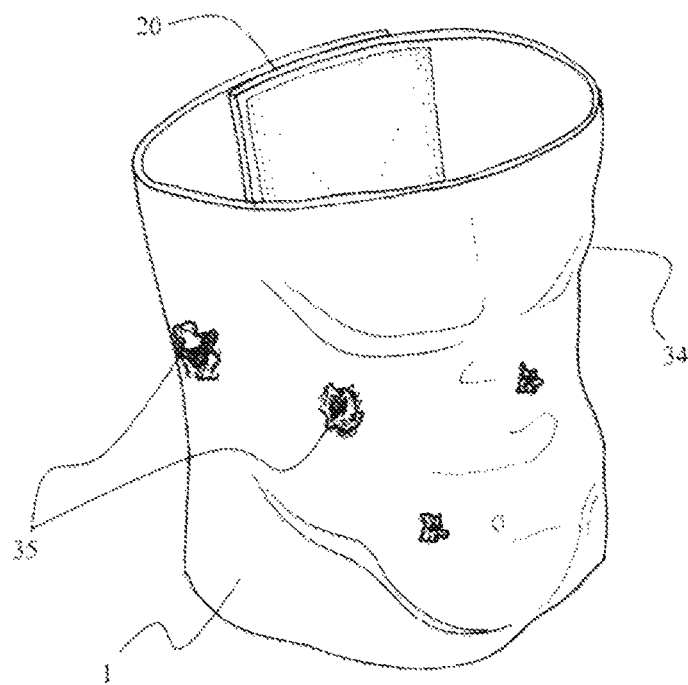
FIG. 15a is perspective view illustrating a torso simulant with a plurality of wounds in accordance with an embodiment of the present invention.
Figure 15B:
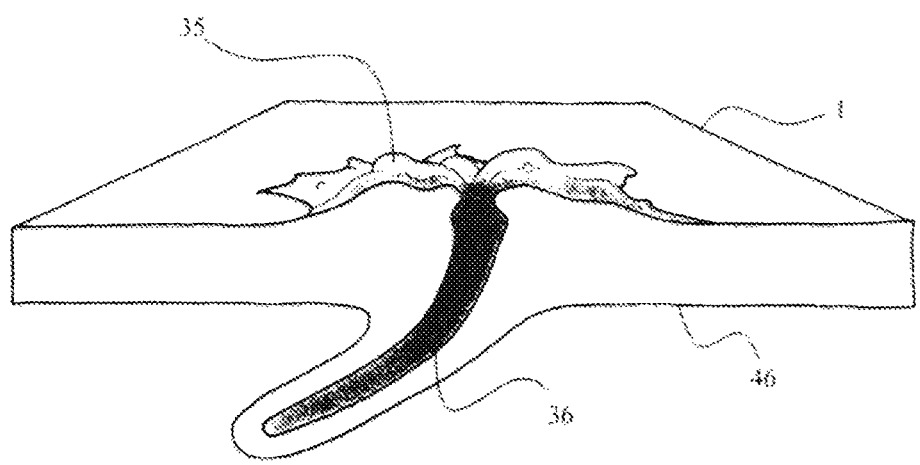
FIG. 15b is a cross-sectional perspective view illustrating a penetration cavity within a skin replica in accordance with an embodiment of the present invention.

Referring now to FIGS. 15a and 15b, a torso simulant 34 with fastener system 20 is shown including a plurality of wounds 35. One or more wounds 35 could include a wound cavity 36 which traverses and extends beyond the skin replica 1. Wound cavities 36 should be sufficiently large and/or expandable so as to allow for the insertion of a finger or probe by a trainee or gauze or other materials used to treat a wound. In preferred embodiments, two wound cavities 36 could be arranged to replicate the entry and exit points produced by a projectile and attached to a supply tube network 29, as described herein. The wound cavity 36 could be fabricated via a complementary structure residing along a mold allowing for the fabrication of a multi-layer structure, as described herein for a skin replica 1. The mold could be textured so that the wound cavity 36 has the tactile properties associated with a gunshot wound or the like. In some embodiments, a fabric layer 5 could be applied to the interior surface 46 of the skin replica 1 to further resist punctures which might result from probing and packing of a wound cavity 36.

Figure 16A:
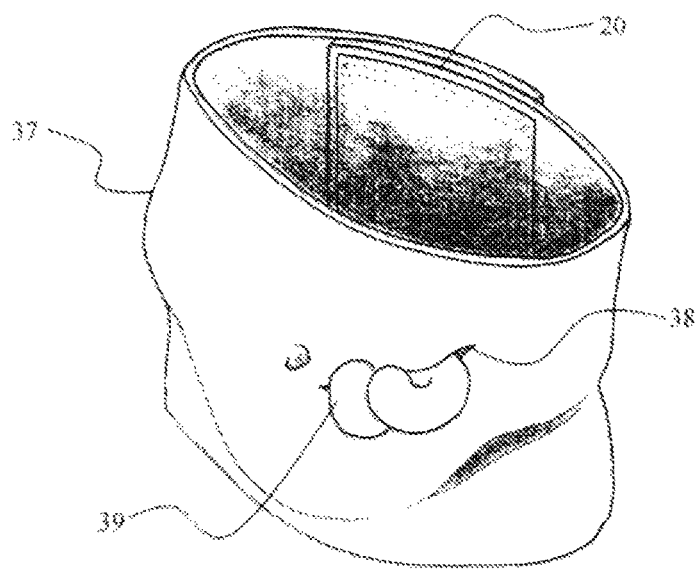
FIG. 16a is a perspective view illustrating a wound with protruding viscera in accordance with an embodiment of the present invention.
Figure 16B:
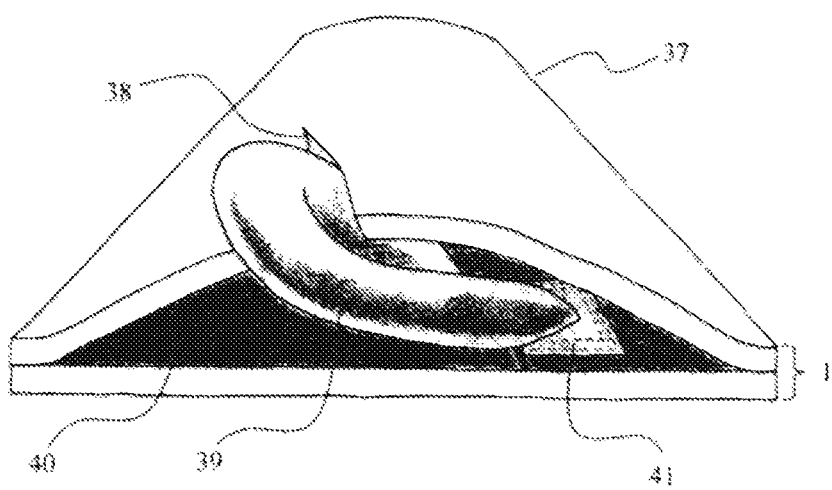
FIG. 16b is a cross-sectional perspective view illustrating attachment of viscera to a skin replica.

Referring now to FIGS. 16a and 16b, a stomach simulant 37 with fastener system 20 is shown with an object 39 extending from a wound 38. The object 39 could represent an internal organ, one example being an intestine, or tissues which are dislodged from a human body. The object 39 could be composed of a pigmented silicone resin replicating the shape, visual, and tactile properties of an internal organ or tissues. The object 39 could be attached to the skin replica 1 via a fastener system 41, one example being a two-piece hook-and-loop device, housed with a cavity 40, as represented in FIG. 16b. In another embodiment, the object 39 could be molded onto a fabric layer 5 as described in FIGS. 5a, 5b, 6a, and 6b. In preferred embodiments, the cavity 40 could be sufficiently voluminous so as to allow for the reinsertion of the object 39 into the skin replica 1 by a trainee. In yet other embodiments, the cavity 40 or object 39 could be attached to a supply tube network 29 and include one or more bleed points, as otherwise described herein.

In some embodiments, it might be advantageous for the wound simulant to not include the fastener system 20 in FIGS. 9a-9c or the fastener system 23 in FIGS. 10a-10b. In these embodiments, the wound simulant could be shaped so as to conformably contact and cover a particular body region either in part of whole. The wound simulant is slipped onto a user's body and slid into position. The wound simulant would include the skin replica 1 described herein, one or more wound structures, and hair, blemishes, body art, and other ornamentation to improve visual realism.

Figure 17:
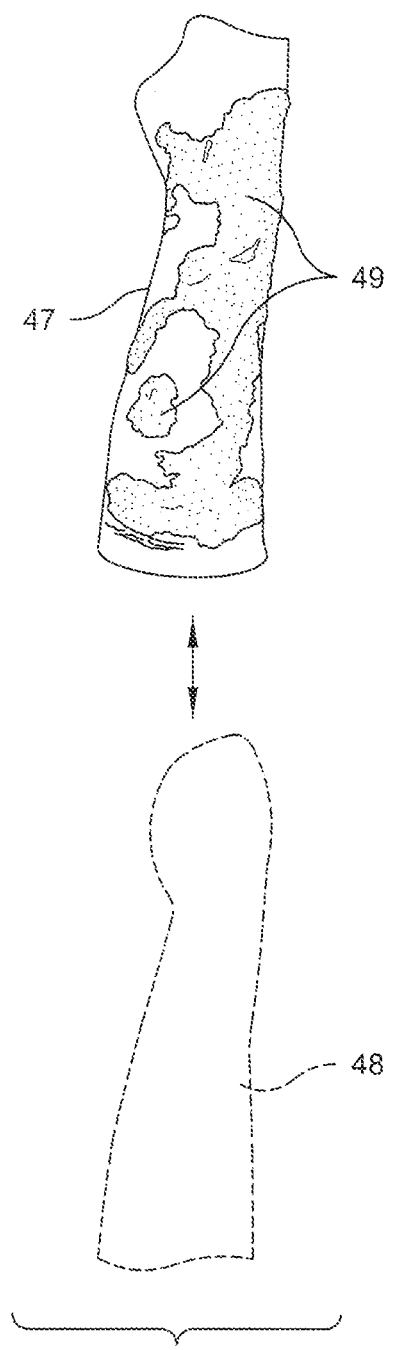
FIG. 17 is a perspective view illustrating a sleeve-shaped wound simulant without fasteners prior to placement onto a body region in accordance with an embodiment of the present invention.

Referring now to FIG. 17, a sleeve-shaped simulant 47 is shown aligned with and prior to placement onto a body region 48. The simulant 47 could be tube shaped with an opening and a length appropriate for the application. In one example, the opening could be sufficiently wide to allow placement onto a torso, either by inserting the legs into the opening and then sliding the simulant 47 up towards the torso or by inserting the head into the opening and then sliding the simulant down towards the torso, and the length fixed so as to cover the abdomen or chest or both or portion thereof. In another example, the opening could be sufficiently wide to allow placement onto an arm, by first inserting a hand into the opening and then sliding the simulant toward the arm, and the length fixed so as to cover the forearm, elbow, and/or bicep or portion thereof. It is also possible for the simulant 47 to include a glove-like element at one end to cover a hand either in part or whole. In yet another example, the opening could be sufficiently wide to allow placement onto a leg, by first inserting a foot into the opening and then sliding the simulant towards the leg, and the length fixed so as to cover the thigh, knee, and/or calf or portion thereof. It is also possible for the simulant 47 to include a sock-shaped element at one end to cover a foot either in part of whole. In still another embodiment, the simulant 47 could be closed at one end so as to form a cap for placement onto a head to cover the hair, face, and/or neck or portion thereof. It might be advantageous in some embodiments to cover a hand alone or separately from an arm or a foot alone or separate from a leg.

Figure 18:
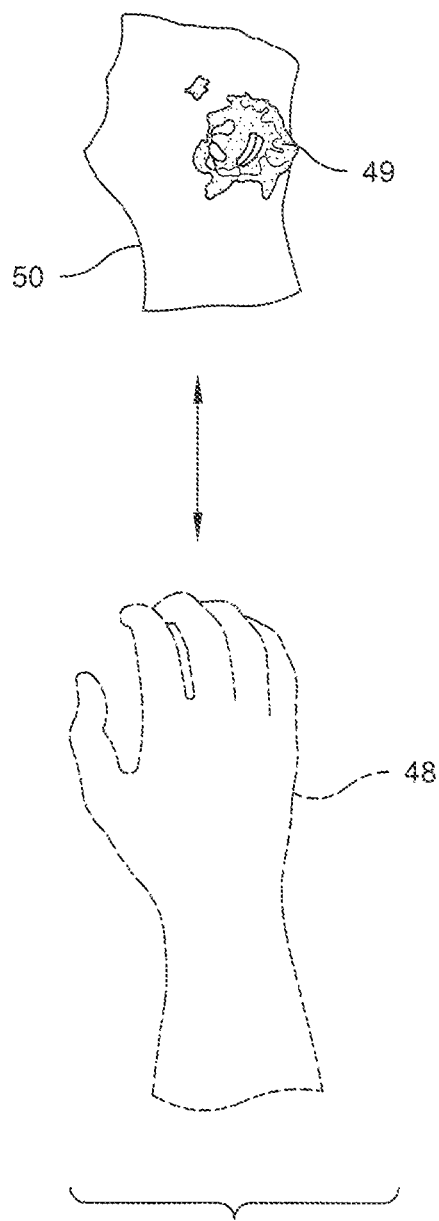
FIG. 18 is a perspective view illustrating a glove-shaped wound simulant without fasteners prior to placement onto a hand in accordance with an embodiment of the present invention.

Referring now to FIG. 18, a glove-shaped simulant 50 is shown aligned with and prior to placement onto a body region 48, specifically a hand. The glove-shaped simulant 50 could conformably contact and cover a hand so as to replicate the appearance of a hand with wound. The glove-shaped simulant 50 may or may not cover one or more fingers and/or thumb. It is likewise possible for other embodiments of the simulant 50 to have a sock-like shape with or without toes so as to cover a foot.

Figure 19:
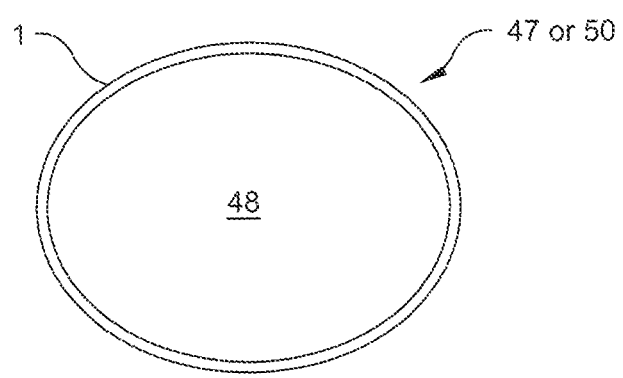
FIG. 19 is a cross-sectional view illustrating a wound simulant disposed about a body region and secured thereto without fasteners.

Referring now to FIG. 19, a simulant 47, 50 is shown disposed about a body region 48. The simulant 47, 50 is dimensioned so as to contact and generally conform to the exterior profile of a body region 48. In some embodiments, the simulant 47, 50 could include an opening dimensionally smaller than the cross section of a body region 48. The simulant 47, 50 is stretched to fit onto and over a body region 48 so as to communicate a compressive force onto the body region 48. The compressive force induced by the bendable layers and/or the fabric layer 5 could secure the simulant 47, 50 to the body region 48. In other embodiments, the simulant 47, 50 could include an opening which is dimensionally larger than the cross section of a body region 48 to provide a loose fit.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A wearable wound simulant comprising:
    (a) a skin replica shaped to conformably contact and cover a body region either in part or whole, said skin replica including:
        (i) a plurality of bendable layers arranged to approximately replicate visual and tactile properties of human tissue; and
        (ii) at least one tear resistant layer comprising a fabric material disposed between two said bendable layers, said tear resistant layer less stretchable than elastic limit of one or more said bendable layers so as to prevent failure thereof, said bendable layers and said tear resistant layer form a self-sealing structure; and
    (b) a wound structure disposed along said skin replica.

2. The wearable wound simulant of claim 1, wherein resilience of said tear resistant layer secures said skin replica to said body region.

3. The wearable wound simulant of claim 1, wherein said tear resistant layer is pre-stressed to apply a compressive load onto said bendable layers.

4. The wearable wound simulant of claim 1, wherein resilience of said bendable layers secures said skin replica to said body region.

5. The wearable wound simulant of claim 1, wherein said wound structure is associated with a penetrating event or a non-penetrating event.

6. The wearable wound simulant of claim 5, wherein said wound structure replicates a bruise, a blunt trauma, a hemorrhage, a laceration, an avulsion, an impalement, an evisceration, a burn, an open wound, a fractured bone, an amputation, or a projectile wound.

7. The wearable wound simulant of claim 1, where said body region is a limb.

8. The wearable wound simulant of claim 1, wherein said body region is a torso.

9. The wearable wound simulant of claim 1, wherein said body region is a head.

10. The wearable wound simulant of claim 1, wherein said skin replica is sock shaped for a foot.

11. The wearable wound simulant of claim 1, wherein said skin replica 1 is glove shaped for a hand.

12. The wearable wound simulant of claim 1, wherein said skin replica is sleeve shaped for a torso.

13. The wearable wound simulant of claim 1, wherein said skin replica is sleeve shaped for a head.

14. The wearable wound simulant of claim 1, wherein said skin replica is sleeve shaped for an arm.

15. The wearable wound simulant of claim 1, wherein said skin replica is sleeve shaped for a leg.

16. The wearable wound simulant of claim 1, further comprising:
   (c) an object fixed to said tear resistant layer so as to protrude from said skin replica, said object replicates impalement of said body region.

17. The wearable wound simulant of claim 1, further comprising:
   (c) an object fixed to said bendable layers so as to protrude from said skin replica, said object replicates impalement of said body region.

\* \* \* \* \*